(12) United States Patent
Chen (10) Patent No.: US 8,812,813 B2
(45) Date of Patent: Aug. 19, 2014

(54) STORAGE APPARATUS AND DATA ACCESS METHOD THEREOF FOR REDUCING UTILIZED STORAGE SPACE

(75) Inventor: Chih-Ta Chen, Hsinchu Hsien (TW)

(73) Assignee: MStar Semiconductor, Inc., Taiwan (TW)

(*) Notice: Subject to any disclaimer, the term of this patent is extended or adjusted under 35 U.S.C. 154(b) by 441 days.

(21) Appl. No.: 12/915,896

(22) Filed: Oct. 29, 2010

(65) Prior Publication Data
US 2011/0107017 A1 May 5, 2011

(30) Foreign Application Priority Data
Nov. 4, 2009 (TW) .............................. 98137413 A (51) Int. Cl.
*G06F 12/02* (2006.01)
*G06F 3/06* (2006.01)
(52) U.S. Cl.
CPC .............. *G06F 3/0641* (2013.01); *G06F 12/02* (2013.01); *G06F 2212/1044* (2013.01); *G06F 3/0608* (2013.01); *G06F 3/0679* (2013.01)
USPC ........................... 711/173; 711/154; 717/164
(58) Field of Classification Search
USPC .................................... 711/154, 173; 717/164
See application file for complete search history.

(56) References Cited

U.S. PATENT DOCUMENTS

2008/0172430 A1* 7/2008 Thorstensen ................. 707/206

* cited by examiner

*Primary Examiner* — Jared Rutz
(74) *Attorney, Agent, or Firm* — Han IP Corporation (57) ABSTRACT

A storage apparatus includes a first data section, a second data section, and a common data section. The first data section stores first data, the second data section stores second data, and the common data section stores common data. The storage apparatus stores a single copy of the common data. The common data and the first data correspond to a first memory bank. The common data and the second data correspond to a second memory bank.

8 Claims, 12 Drawing Sheets

STORAGE APPARATUS AND DATA ACCESS METHOD THEREOF FOR REDUCING UTILIZED STORAGE SPACE

CROSS REFERENCE TO RELATED PATENT APPLICATIONS

This patent application claims priority from Taiwan Patent Application No. 098137413, filed in the Taiwan Patent Office on Nov. 4, 2009, entitled "Storage Apparatus and Data Access Method Thereof", and incorporates the Taiwan patent application in its entirety by reference.

TECHNICAL FIELD

The present disclosure relates to a data access mechanism, and more particularly, to a storage apparatus and a data access method thereof applied to data processing systems, e.g., an embedded system, a microprocessor or a development platform.

BACKGROUND OF THE PRESENT DISCLOSURE

A current 8-bit microprocessor has an addressing ability of handling a 64K-byte data at a time for a program memory and a data memory of. However, a program code to be accessed or executed by the current 8-bit microprocessor is usually more than 64K bytes. Therefore, the program code needs to be divided into a plurality of data blocks each having 64K-byte data. The plurality of data blocks are stored in an external storage medium of the 8-bit microprocessor, and the storage medium may be a non-volatile memory, e.g., a flash memory. When the 8-bit microprocessor wants to access or execute the program code, the plurality of data blocks are first accessed from the flash memory and are temporarily stored into a volatile memory (e.g., a dynamic random access memory (DRAM)), from which the 8-bit microprocessor then accesses the program code.

In order to effectively access data by the 8-bit microprocessor, partial data of each of the data blocks each having 64K-byte data are designed as having some same common data. Suppose the 8-bit microprocessor first accesses content of a data block A, and then switches from the data block A to access content of a data block B, content of the common data is accessed to obtain information for switching to the data block B, so as to avoid discontinuousness of instructions. Therefore, bank switching instructions for switching between memory banks are stored in same common data. In the prior art, all data of each data block are stored into the flash memory; however, much storage space of the flash memory is wasted for storing the common data since all data blocks contain the content of the common data. For an embedded system or other microprocessor systems, effective utilization of storage space of the flash memory is extremely important. Therefore, there is a need to provide a solution to effectively reduce the storage space of the flash memory.

SUMMARY OF THE PRESENT DISCLOSURE

Therefore, one object of the present disclosure is to provide a storage apparatus and associated access method. The storage apparatus has a structure applicable for data processing systems, e.g., an embedded system or other microprocessor systems, and is capable of effectively reducing storage space of storage units to achieve an object of reducing circuit cost as well as improving performance.

According to an embodiment of the present disclosure, a storage apparatus comprises a first storage unit, a second storage unit and a controller. The first storage unit comprises a common section for storing common data; a first data section for storing first data; and a second data section for storing second data. The controller coupled to the first and second storage units transfers the common data, the first data and the second data from the first storage unit to the second storage unit. In addition, the first storage unit is stored with one single copy of common data. The common data and the first data are written into the second storage unit to form a first memory bank, and the common data and the second data are written into the second storage unit to form a second memory bank.

According to another embodiment of the present disclosure, a storage apparatus comprises a first data section for storing first data; a second data section for storing second data; and a common data section for storing common data. The storage apparatus is stored with one single copy of the common data. The common data and the first data correspond to a first memory bank, and the common data and the second data correspond to a second memory bank.

According to yet another embodiment of the present disclosure, an access method is applied to a storage apparatus that comprises a first storage unit. The access method comprises storing common data into a common data section of the first storage unit; storing first data into a first data section of the first storage unit; and storing second data into a second data section of the first storage unit. The first storage unit is stored with one single copy of the common data. The common data and the first data correspond to a first memory bank, and the common data and the second data correspond to a second memory bank.

Characteristics of the embodiments of the present disclosure are that, a non-volatile storage unit (e.g., a flash memory) is stored with only one single copy of common data to effectively reduce storage space.

DETAILED DESCRIPTION OF THE PREFERRED EMBODIMENTS

Figure 1:
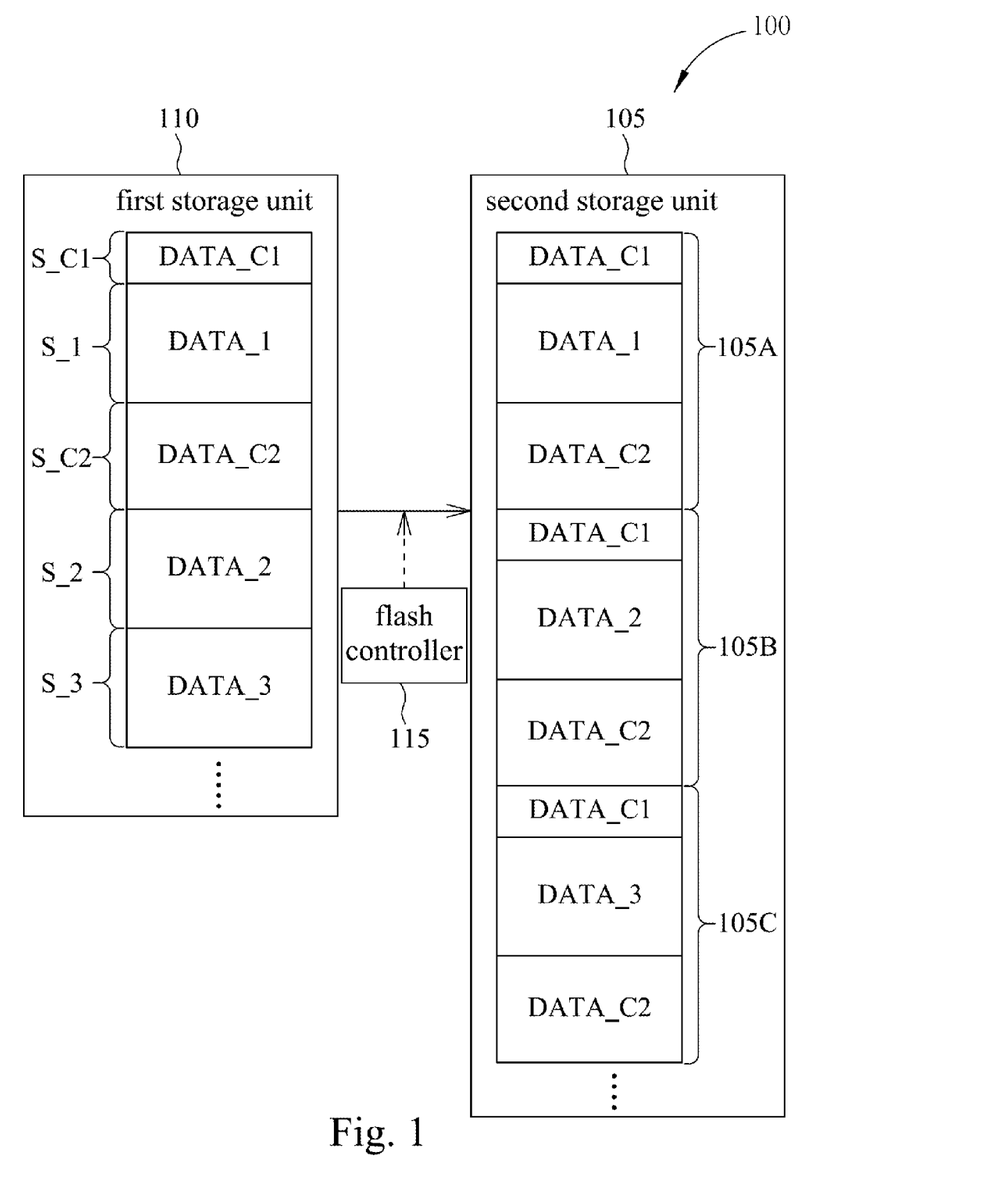
FIG. 1 is a block diagram of a storage apparatus in accordance with a first embodiment of the present disclosure.

FIG. 1 shows a block diagram of a storage apparatus 100 in accordance with a first embodiment of the present disclosure. The storage apparatus 100 is applied to data processing systems, e.g., an embedded system, a microprocessor or a development platform. In addition to the storage apparatus 100, the embedded system or the microprocessor system further comprises a central processing unit (CPU) and an input/output (I/O) unit. In this embodiment, the embedded system or the microprocessor system has an 8-bit microprocessor, e.g., an 8051 single-chip processor or an 89C51 single-chip processor. The storage apparatus 100 is stored with data such as program codes, constant data, variable data or stacks. More specifically, the storage apparatus 100 comprises a first storage unit 110 and a second storage unit 105. The first storage unit 110 is realized by a read-only memory (ROM), or a flash memory. The second storage unit 105 is realized by a random access memory (RAM), e.g., a DRAM. Therefore, the first storage unit 110 is utilized for repeated data recording. For example, the second storage unit 105 is for storing variables of a program design, and the first storage unit 110 is for storing program codes and constant data for the program codes. For illustration purposes, the first storage unit 110 is to be referred to as a flash memory, and the second storage unit 105 is to be referred to as a DRAM.

Referring to FIG. 1, the DRAM 105 is stored with a plurality of banks, e.g., a first memory bank 105A, a second memory bank 105B and a third memory bank 105C. To match with the data addressing ability of an 8-bit microprocessor, each of the memory banks has a same 64-byte size, for example. The DRAM 105 can comprise more than three memory banks; however, the number of the memory banks according to the present disclosure is not limited to the number used in this embodiment. Since the data addressing ability of the 8-bit micro-processing is equivalent to the 64-byte data size (i.e., a data size of a memory bank), a program code needs to be divided and stored in N 64-byte data blocks when the program code carries a large amount of data, i.e., the program code is distributed in N memory banks, where N is theoretically larger than or equal to 2 and is determined according to the data of the program code in practice. For that the DRAM 105 has a relatively fast access speed, the DRAM 105 is stored with the N memory banks that are to be accessed by the microprocessor when the system having the microprocessor is operating. For example, the three memory banks 105A to 105C are stored one after another into the DRAM 105 according to a sequence shown in FIG. 1. It is to be noted that, in the DRAM 105 or the flash memory 110 in FIG. 1, vertically consecutive data represent consecutive data addressing spaces, e.g., two data addressing spaces occupied by data DATA_C1 and DATA_1 stored in the DRAM 105 may form a consecutive data addressing space.

In addition, since the DRAM 105 is a volatile memory, a voltage for recording data vanishes over time when the embedded system, the microprocessor or the development platform is turned off. Therefore, before the embedded system, the microprocessor or the development platform is turned on, the program code and data are stored/recorded in the flash memory 110 (i.e., a non-volatile memory) to avoid data loss. When the embedded system, the microprocessor or the development platform is turned on, the program code and data are accessed from the flash memory 110 and are stored into the DRAM 105. It is to be noted that, data content of the DRAM 105 in FIG. 1 is generated by replicating from the flash memory 110.

For the embedded system, the microprocessor or the development platform, a size of storage space of the flash memory 110 is a rather important cost consideration, and the storage space of the flash memory 110 is reduced as much as possible under the condition that the embedded system, the microprocessor or the development platform can maintain normal operations according to the embodiment of the present disclosure. That is to say, under the condition that the microprocessor according to the present disclosure normally accesses and executes the program code, a program data storage configuration of the flash memory 110 is differently designed, and a corresponding data transmission approach between the flash memory 110 and the DRAM 105 is also provided. In other words, two characteristics of the present disclosure are that, the storage configuration for storing the program code and data into the flash memory 110 is different from that in the prior art, and approaches for accessing the data from the flash memory 110 and writing the data into the DRAM 105 are different from those in the prior art. It is to be noted that, the data content and the storage sequence of the flash memory 110 in FIG. 1 are different from those of the DRAM 105, and details thereof are described below.

The flash memory 110 comprises a common data section and N data sections S_1 to S_N, out of which only the first to third data section S_1 to S3 are illustrated in FIG. 1 for example. The common data section is stored with common data DATA_C (i.e., comprising first common data DATA_C1 and second first common data DATA_C2) corresponding to a plurality of memory banks. The common data section comprises a first common data section S_C1 for storing the first common data DATA_C1, and a second common data section S_C2 for storing the second common data DATA_C2. An addressing space of the first common data section S_C1 is not adjacent to that of the second common data section S_C2 in this embodiment (as shown in FIG. 1). In addition, the first data section S_1 stores first data DATA_1, the second data section S_2 stores second data DATA_2, and a storage space size of the first data section S_1 may be different from that of the second data section S_2. The common data DATA_C and each of memory bank data DATA_1 to DATA_N respectively form a memory bank after having been written into the DRAM 105, thus forming N memory banks. For example, the common data DATA_C and the first data DATA_1 are written into the DARM 105 to form a first memory bank 105A, and the common data DAT_C and the second data DATA_2 are written into the DRAM 105 to form a second memory bank 105B. It is to be noted that, a data size of the first data DATA_1 may be different from that of the second data DATA_2.

In order to reduce utilized storage space, the flash memory 110 is stored with only one single copy of common data DATA_C (e.g., data of the flash memory 110 is arranged as shown in FIG. 1), i.e., in practice, all of the N memory banks comprise the common data DATA_C, and the flash memory 110 according to the present disclosure is stored with only one single copy of common data DATA_C to reduce the data storage space by N−1 common data sections. For example, when the data DATA_C has a 30K-byte data size, and the flash memory 110 comprises 60 memory banks (i.e., N is equal to 60), the data storage space according to the present disclosure is capable of reducing data storage space by 59×30K bytes, which is about 1.72 million bytes. For cost considerations, for example, the total data storage space of the flash memory 110 has an 8 million-byte size, and thus about two twenty percent of the data storage space is reduced according to the present disclosure to achieve an extremely significant difference in storage space reduction. It is to be noted that, the data size of the common data DATA_C may be determined according to user requirements, and the 30K-byte size is only taken as an example and shall not construed as limiting the present disclosure.

In addition, since access speeds of the DRAM 105 and the flash memory 110 are different, when the embedded system, the microprocessor or the development platform is turned on, the flash memory 110, via a flash controller 115, transfers by direct memory access (DMA) the common data DATA_C and N data DATA_1 to DATA_N corresponding to N memory banks into the DRAM 105 to be accessed by the subsequent microprocessor. In this embodiment, the first common data DATA_C1 comprises program instructions and data needed for switching data access between the memory banks, e.g., an interrupt routine instruction or constant data, and the second common data DATA_C2 comprises common program instructions of the memory banks DATA_1 to DATA_N. The flash controller 115 writes the data of the flash memory 110 by DMA into the DRAM 105 (having a data storage configuration as shown in FIG. 1).

Figure 2A:
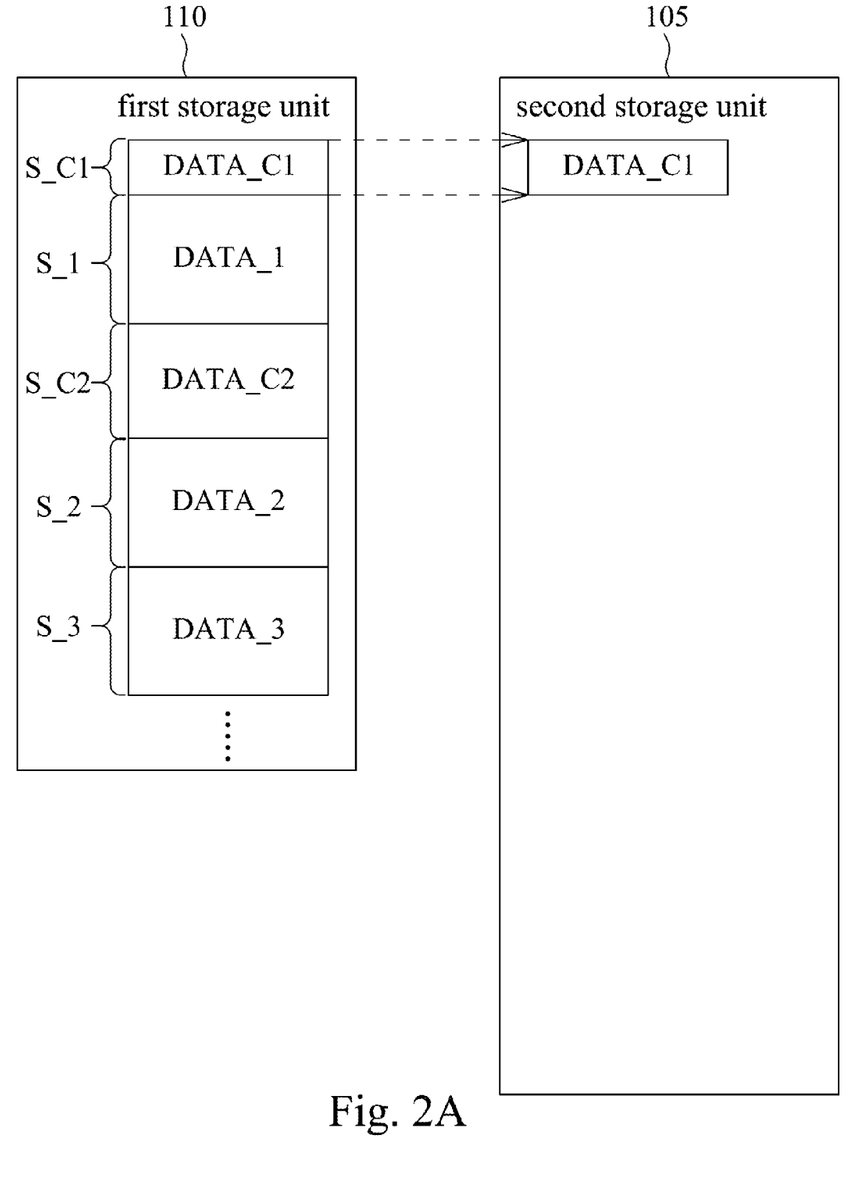
FIG. 2A to FIG. 2C, FIG. 3A to FIG. 3C and FIG. 4A to FIG. 4C are respectively schematic diagrams of accessing data stored in the storage apparatus in FIG. 1.
Figure 2B:
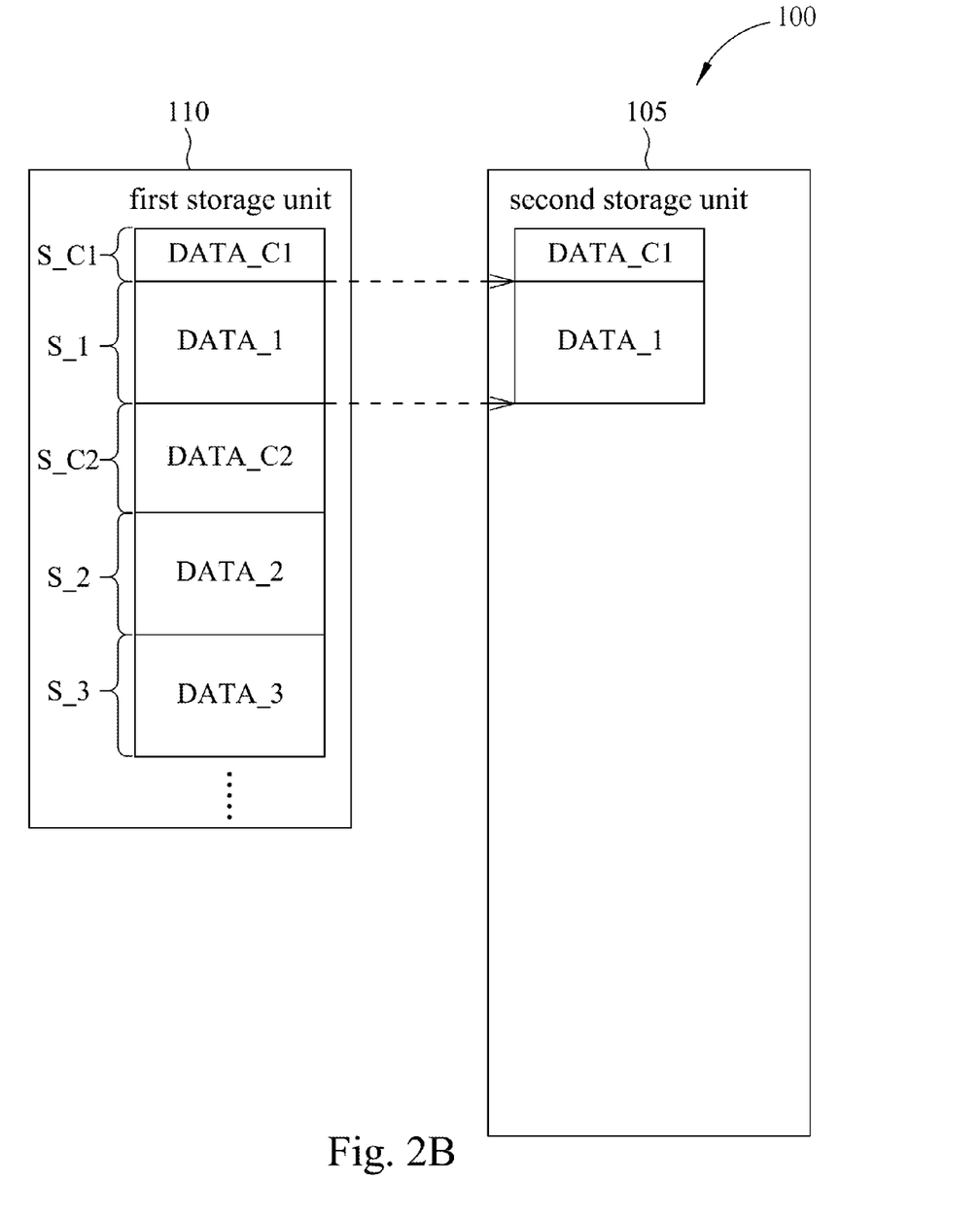
Figure 2C:
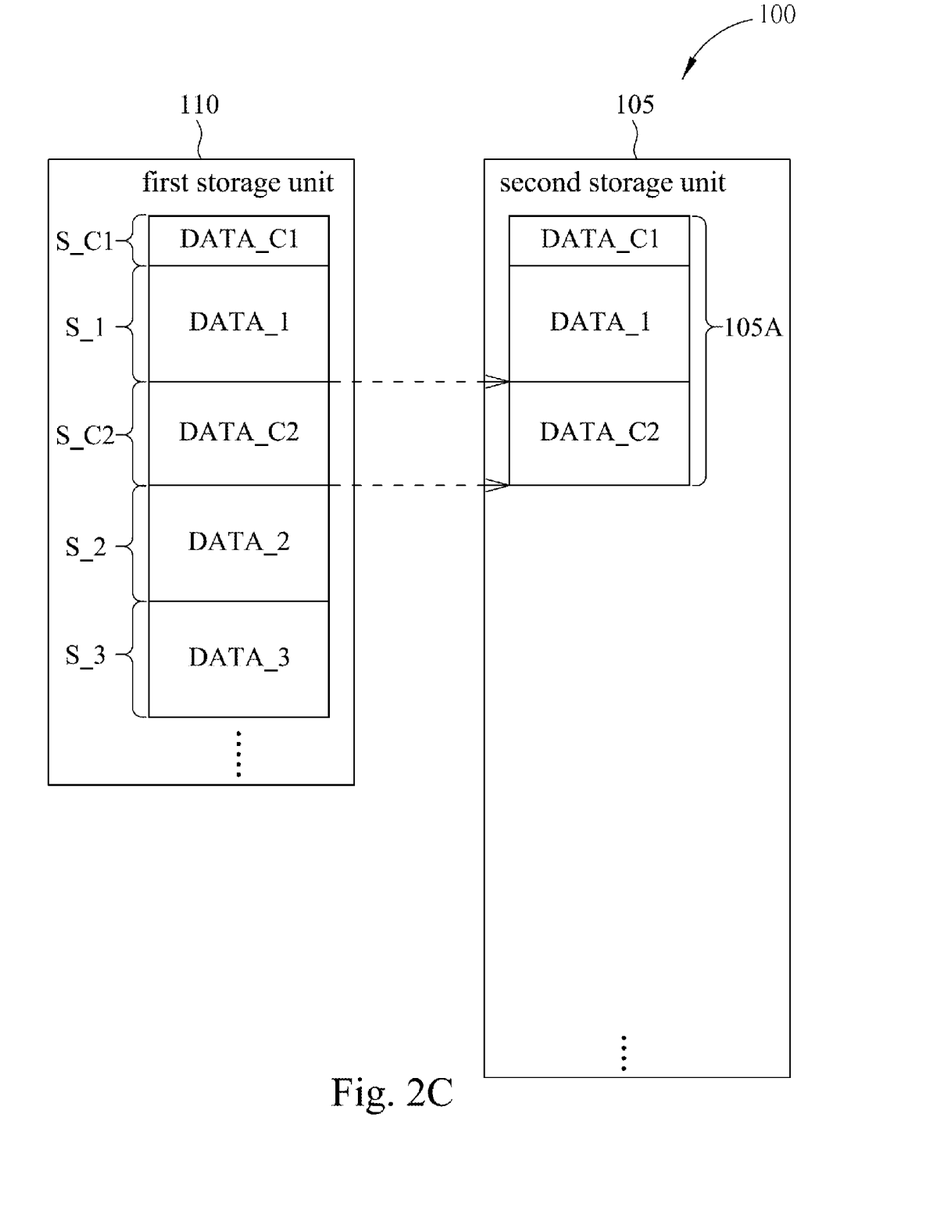
Figure 3A:
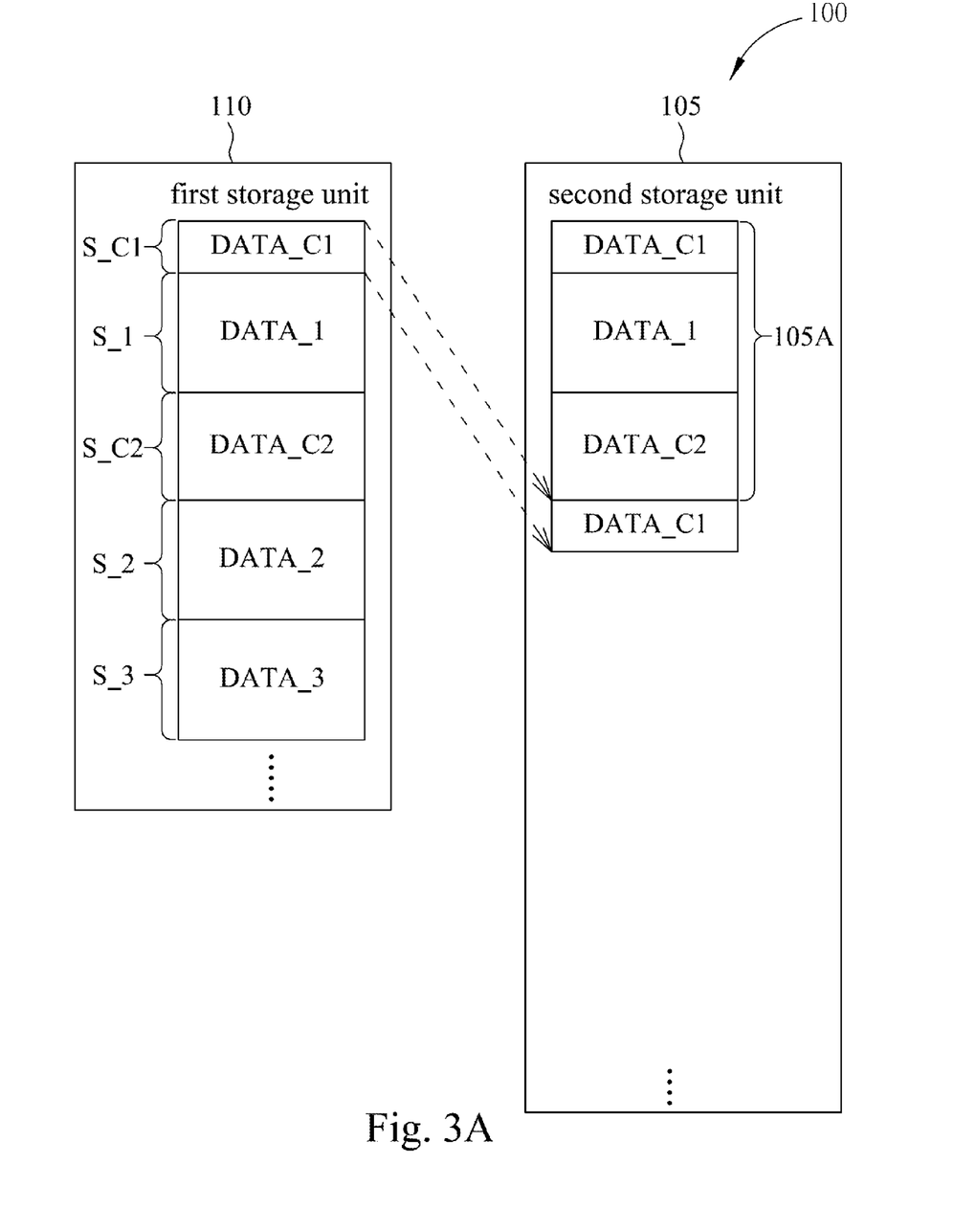
Figure 3B:
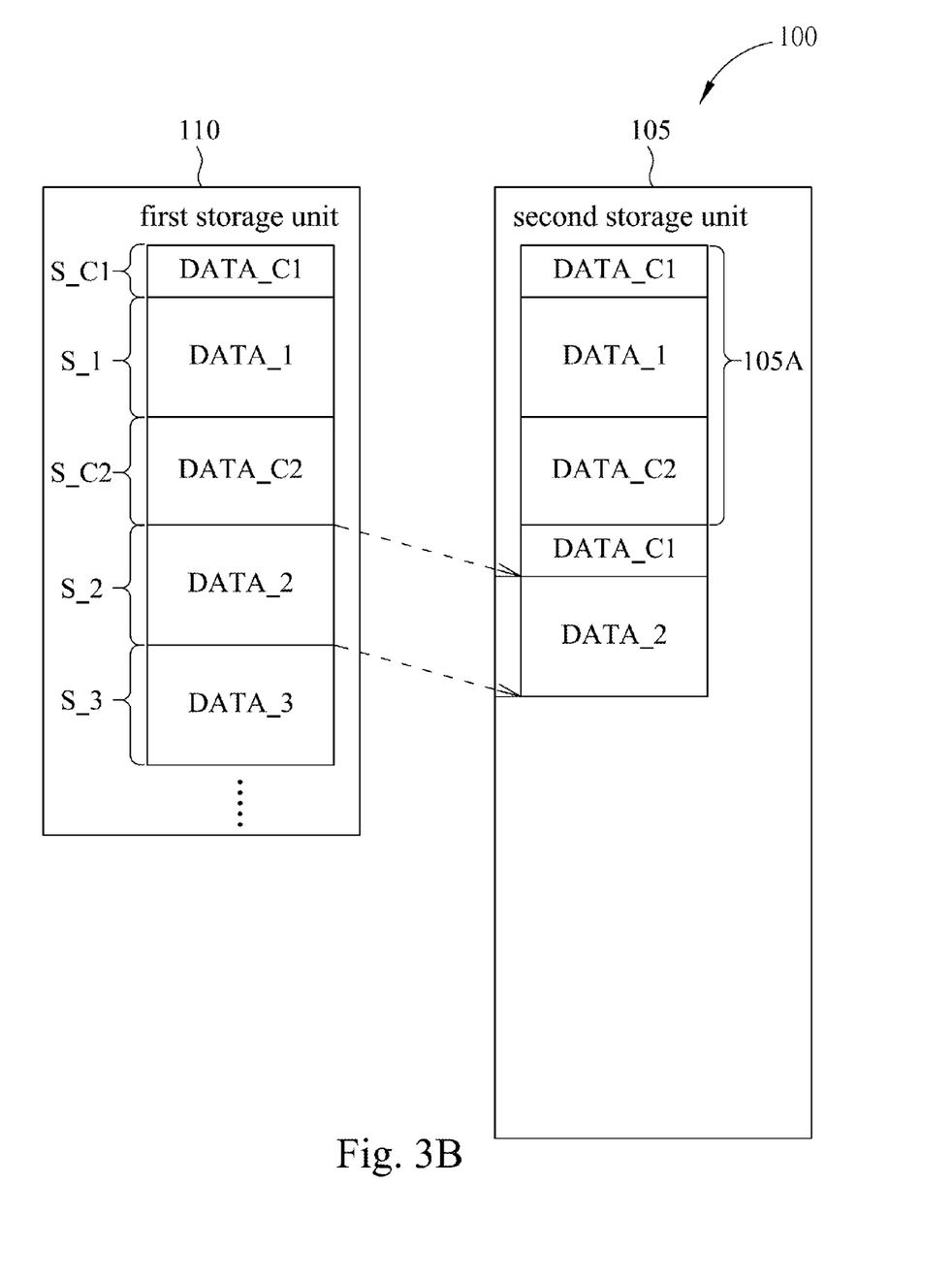
Figure 3C:
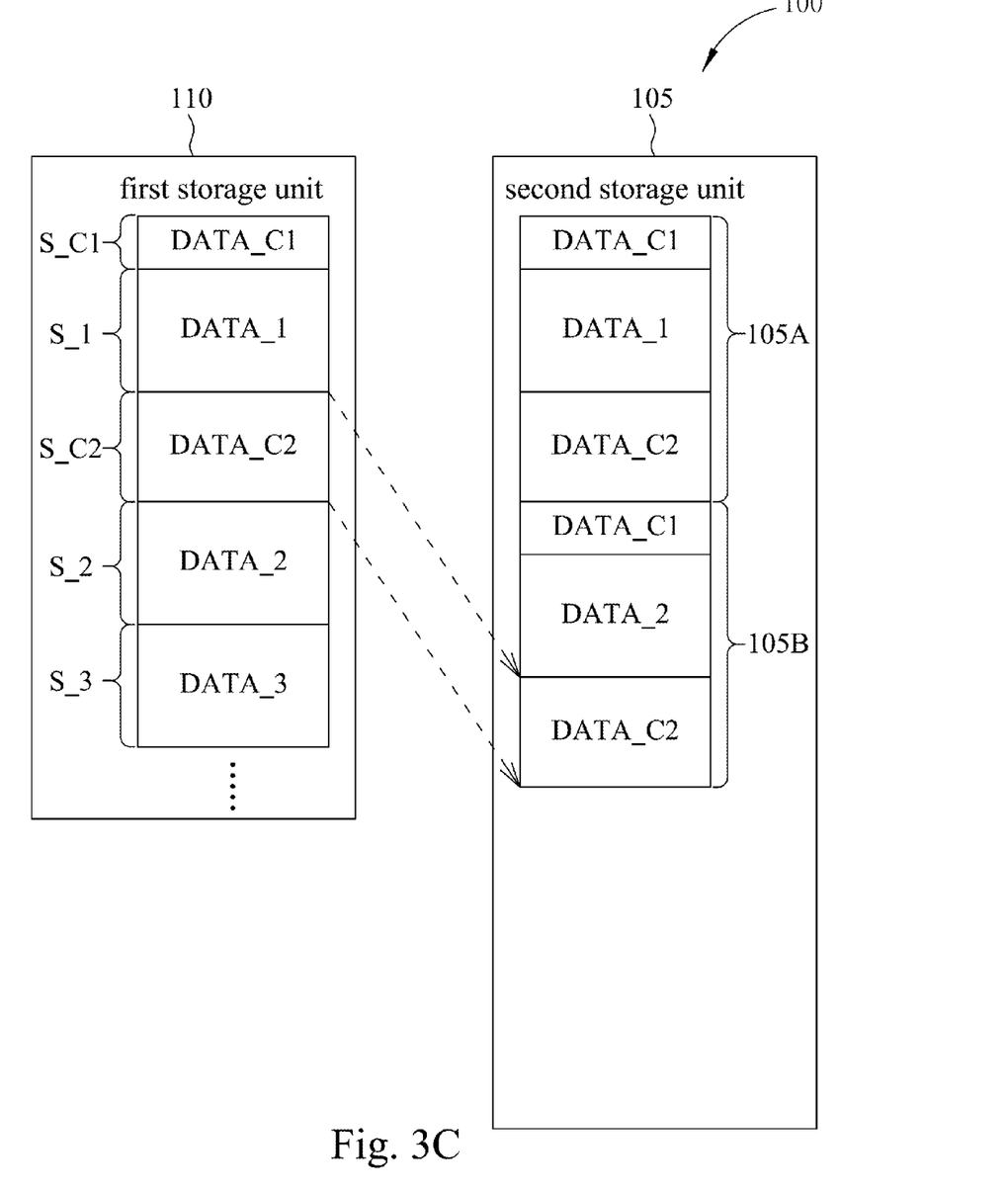

The following description is given with reference to FIG. 2A to FIG. 2C, FIG. 3A to FIG. 3C and FIG. 4A to FIG. 4C, which are respectively schematic diagrams of data access of the storage apparatus 100 in FIG. 1. When the data processing system such as the embedded system, the microprocessor or the development platform is turned on, the flash controller 115 first reads the first common data DATA_C1 from the flash memory 110 and writes it into the DRAM 105 as shown in FIG. 2A, and then reads the first data DATA_1 from the flash memory 110 and writes it into the DRAM 105 as shown in FIG. 2B. After that, the flash controller 115 reads the second common data DATA_C2 from the flash memory 110 and writes it into the DRAM 105 as shown in FIG. 2C. That is to say, the common data DATA_C comprising the data DATA_C1 and DATA_C2 and the first data DATA_1 are simultaneously read from the flash memory 110, and are written into the DRAM 105 to form the first memory bank 105A. Referring to FIG. 3A to FIG. 3C, the flash controller 115 reads the data DATA_C1, DATA_2 and DATA_C2 in sequence from the flash memory 110, and writes them into the DRAM 105, i.e., the common data DATA_C and the second data DATA_2 are simultaneously read from the flash memory 110 and written into the DRAM 105 to form the second memory bank 105B. Likewise, referring to FIG. 4A to FIG. 4C, the flash controller 115 reads data DATA_C1, DATA_3 and DATA_C2 in sequence from the flash memory 110, and writes them into the DRAM 105 to form the third memory bank 105C. Therefore, after the foregoing operations are completed, the microprocessor begins to perform data processing or execute a program code. When the current memory bank needs to be switched, the microprocessor switches the current memory bank with reference to the common data DATA_C. It is to be noted that, the foregoing first data DATA_1 comprises information of the size or the addressing space of the data DATA_C. Therefore, the flash controller 115 may identify the storage address corresponding to the common data DATA_C in the flash memory 110 via the information of the common data DATA_C and thereby identifying the common data DATA_C. Then, the flash controller 115 can successfully writes the common data DATA_C and the second data DATA_2 into the DRAM 105 to form the second memory bank 105B.

Figure 4A:
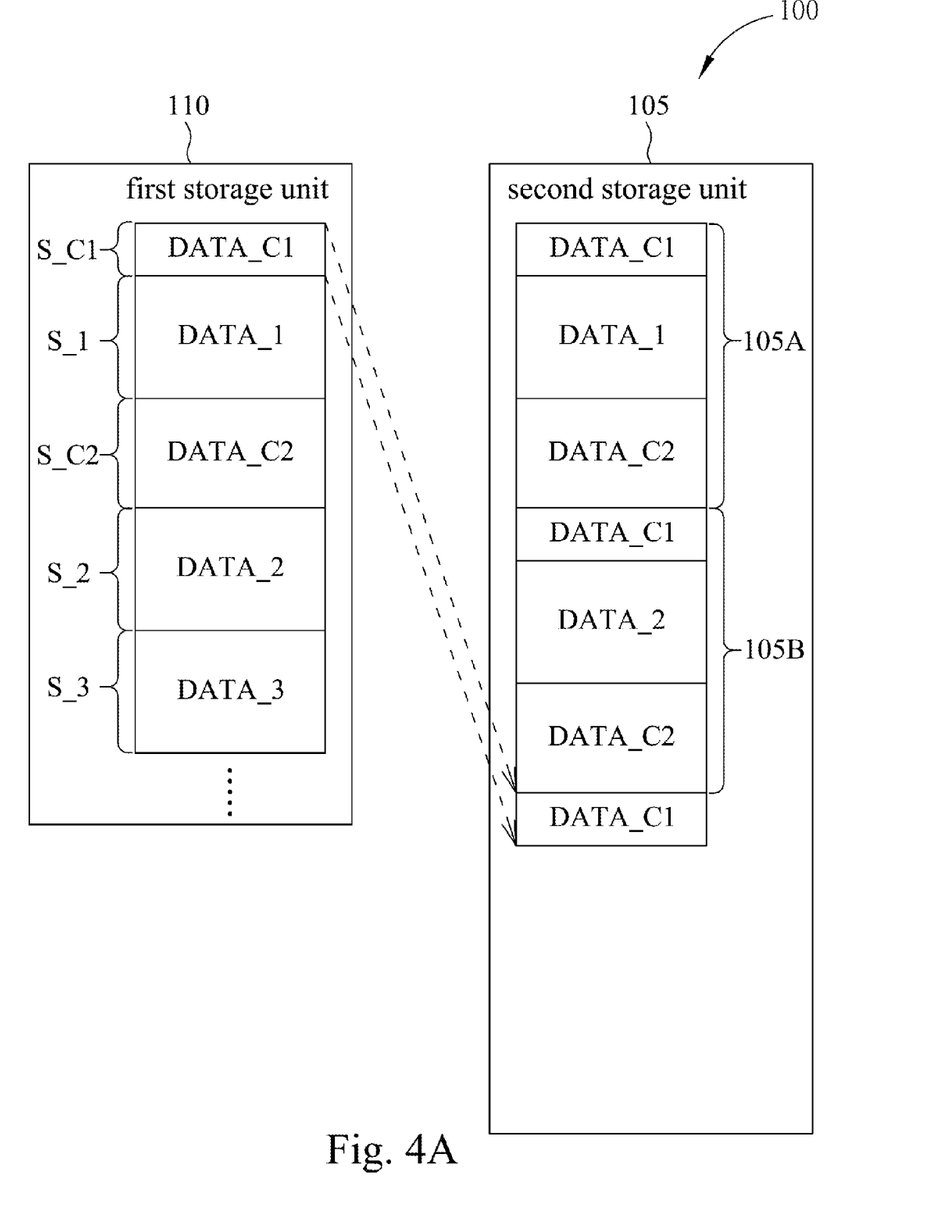
Figure 4B:
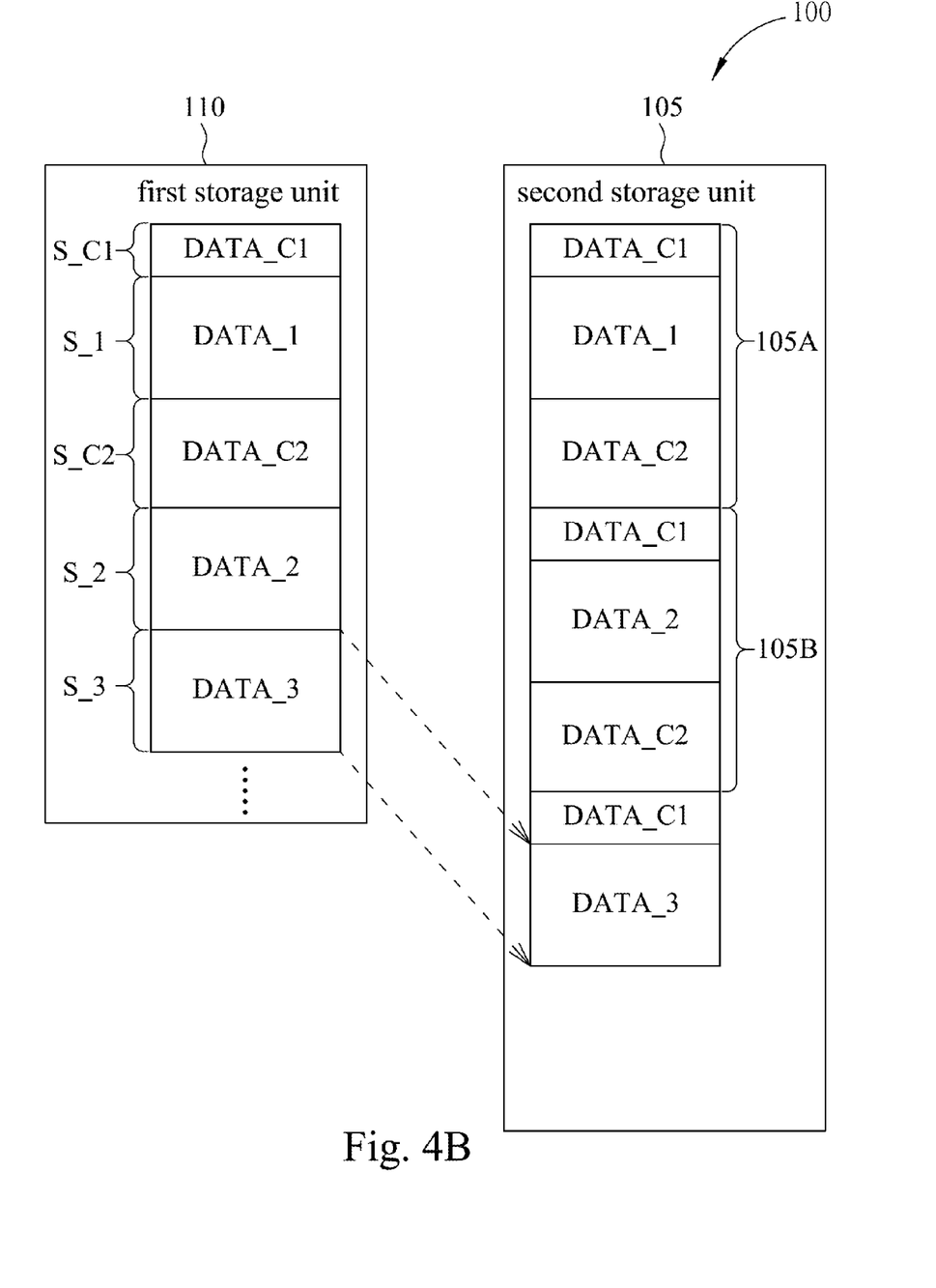
Figure 4C:
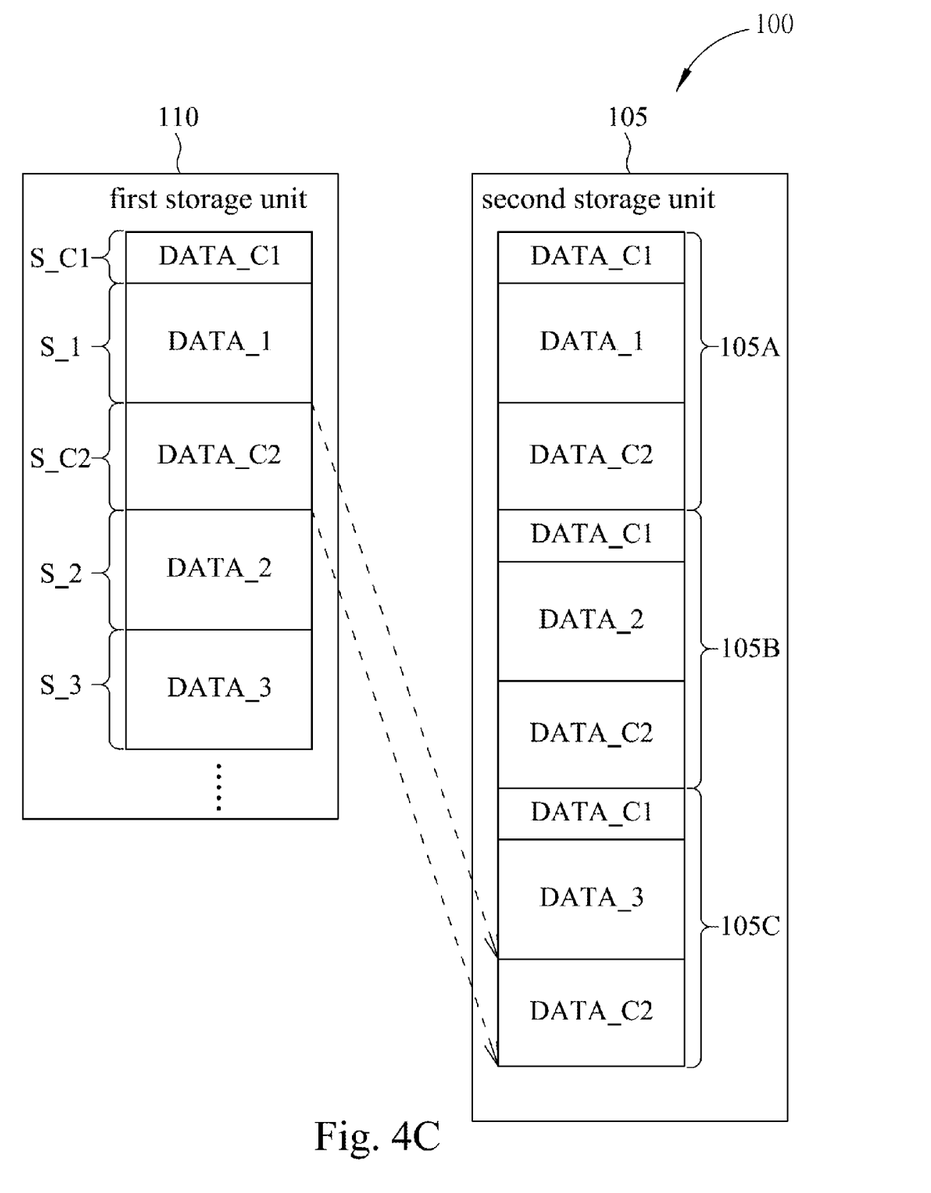

In another embodiment, instead of reading the common data DATA_C (i.e., the first and second common data DATA_C1 and DATA_C2) from the flash memory 110 as shown in FIG. 3A and FIG. 3C, one copy of the previously stored common data DATA_C is directly replicated from the first memory bank 105A of the DRAM 105. The replicated common data DATA_C and the second data DATA_2 read from the flash memory 110 then form the second memory bank 105B of the DRAM 105. Likewise, instead of reading the common data DATA_C from the flash memory 110 as shown in FIG. 4A and FIG. 4C, one copy of the previously stored common data DATA_C is replicated from the first memory bank 105A of the DRAM 105. The replicated common data DATA_C and the third data DATA_3 read from the flash memory 110 then form the third memory bank 105C of the DRAM 105. Through the foregoing data access and storage operations, the program codes and data previously stored in the DRAM 105 are read when a CPU needs to access them for program computation.

Although the foregoing embodiments are applied to the 8-bit microprocessor, the design of the storage apparatus according to the present disclosure is also applicable to a 16-bit, 32-bit or 64-bit microprocessor, i.e., a microprocessor or a microcontroller having data addressing ability with a 64K-byte addressing space is not a limitation of the present disclosure.

Figure 5:
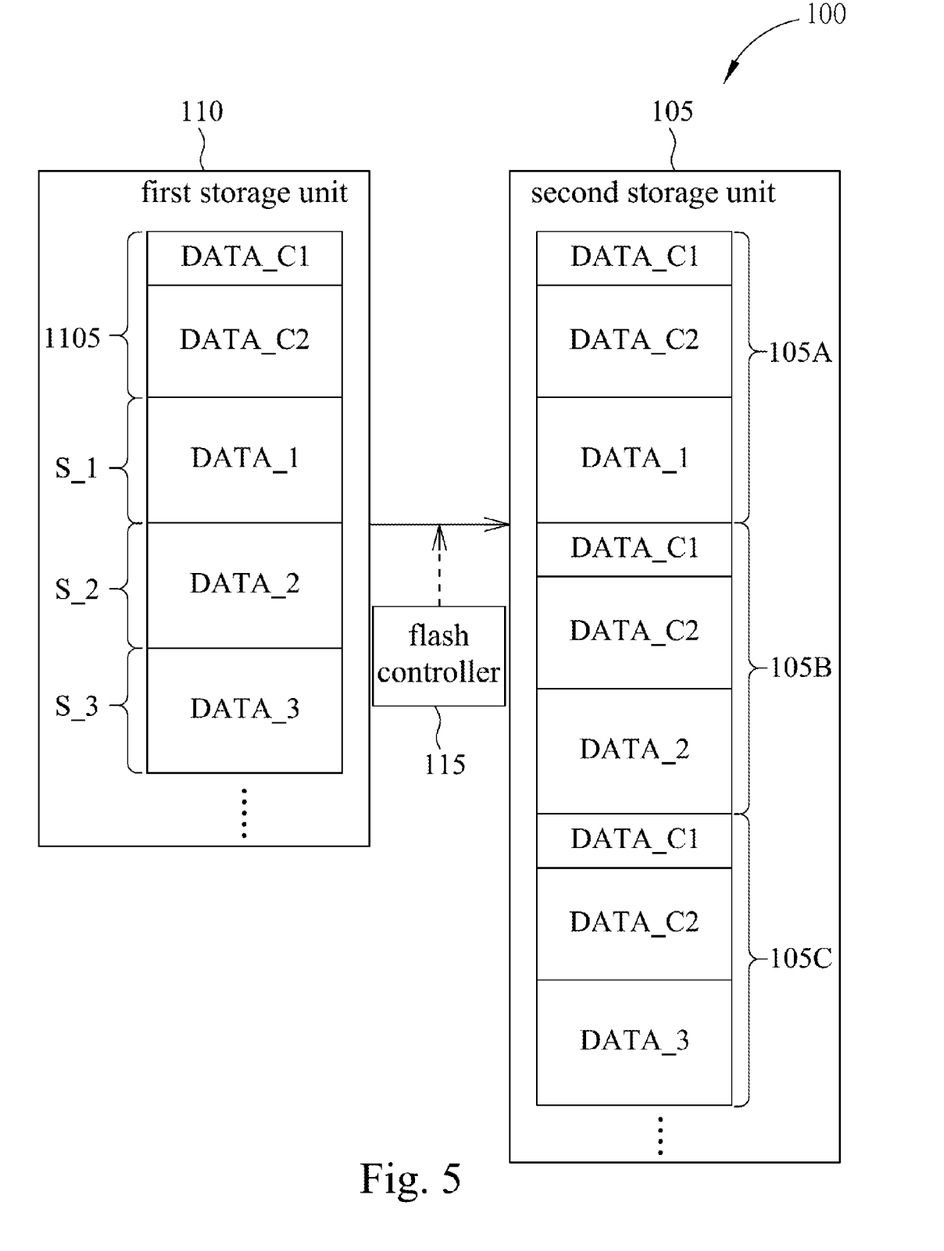
FIG. 5 is a block diagram of a storage apparatus in accordance with a second embodiment of the present disclosure.

In a second embodiment, data addressing spaces occupied by the first and second common data DATA_C1 and DATA_C2 may be consecutive data addressing spaces. FIG. 5 shows a block diagram of the storage apparatus 100 in accordance with the second embodiment of the present disclosure, detailed thereof shall not be described for brevity.

Figure 6:
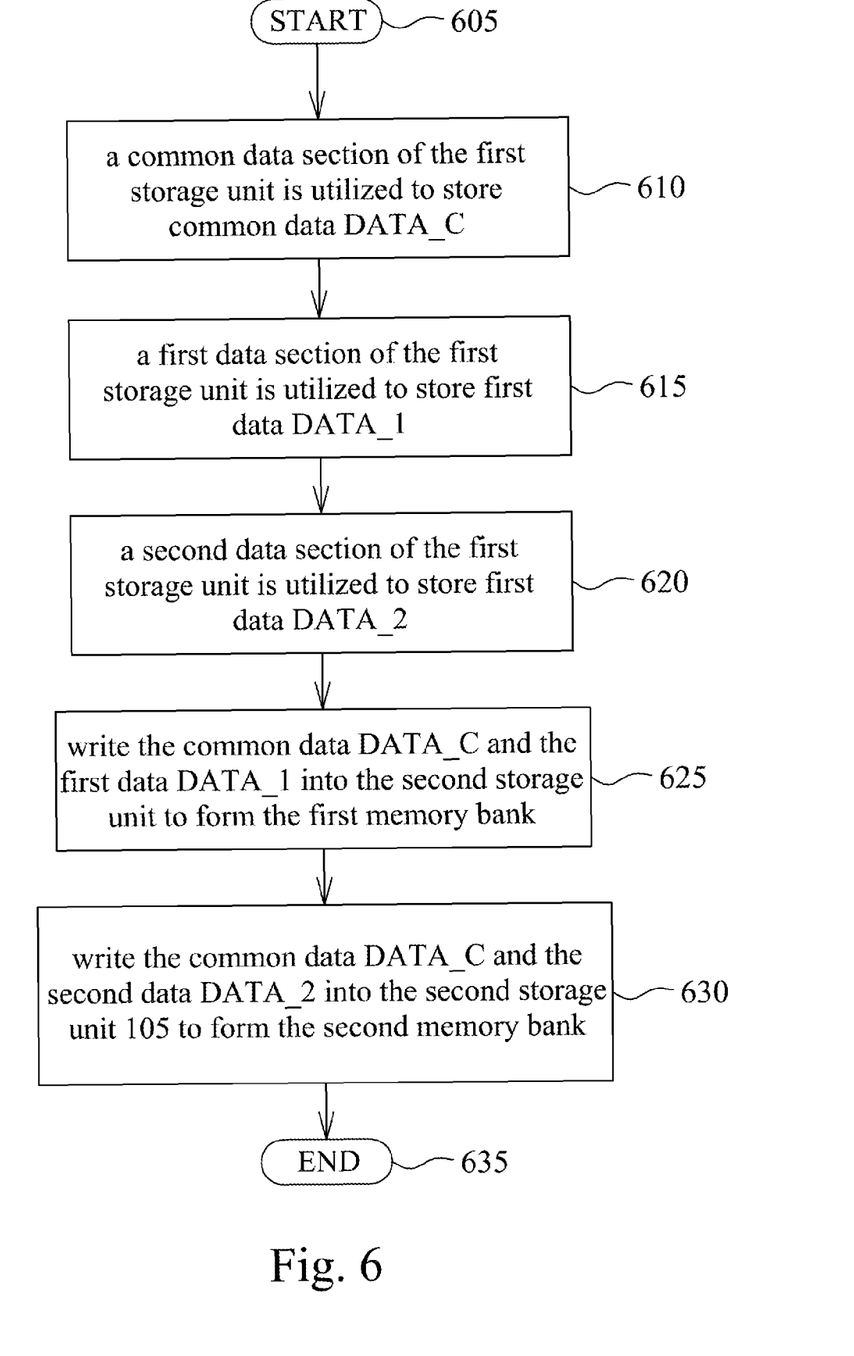
FIG. 6 is a flow chart of a data access method applied to the storage apparatus in FIG. 1.

FIG. 6 shows a flow chart of data access operations of the storage apparatus 100 in FIG. 1 to gain a better understanding of the spirit of the present disclosure. Steps of the flow in FIG. 6 need not be performed according to the original sequence, nor the steps of the flow need be consecutively performed, provided that a substantially same result is obtained, i.e., other steps may be added to the flow. The steps of the flow are described below.

The flow begins with Step 605. In Step 610, a common data section 1105 of the first storage unit 110 is utilized to store common data DATA_C. In this embodiment, the first storage unit 110 is stored with one single copy of the common data DATA_C. In Step 615, a first data section (e.g., S_1) of the first storage unit 110 is utilized to store first data DATA_1. In Step 620, a second data section (e.g., S_2) of the first storage unit 110 is utilized to store first data DATA_2. In Step 625, when the data processing system is turned on, the common data DATA_C and the first data DATA_1 are written into the second storage unit 105 to form the first memory bank 105A. In Step 630, the common data DATA_C and the second data DATA_2 are written into the second storage unit 105 to form the second memory bank 105B. The flow ends in Step 635.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:
1. A storage apparatus, comprising:
   a first storage unit, comprising:
      a common data section that stores common data;
      a first data section that stores first data; and
      a second data section that stores second data;
   a second storage unit; and
   a controller that transfers the common data, the first data, and the second data from the first storage unit to the second storage unit,
   wherein the first storage unit stores a single copy of the common data,
   wherein the common data and the first data are stored in the second storage unit to form a first memory bank, and the common data and the second data are stored in the second storage unit to form a second memory bank, and
   wherein the controller reads the common data from the first storage unit and stores the common data into the second storage unit to form the first memory bank with the first data read from the first storage unit, and the controller replicates a copy of the common data by directly using the common data stored in the second storage unit to form the second memory bank with the second data read from the first storage unit.

2. The storage apparatus as recited in claim 1, wherein the first storage unit is a flash memory, and the second storage unit is a dynamic random access memory (DRAM).

3. The storage apparatus as recited in claim 1, wherein a size of the first memory bank is equal to that of the second memory bank, and a size of a storage space of the first data section is different than that of a storage space of the second data section.

4. The storage apparatus as recited in claim 1, wherein the first data comprises information of a data size or an addressing space of the common data, and the controller writes the common data and the second data into the second storage unit according to the information of the data size or the addressing space of the common data to form the second memory bank.

5. A data access method, applied to a storage apparatus comprising a first storage unit, the method comprising:
   storing common data into a common data section of the first storage unit;
   storing first data into a first data section of the first storage unit;
   storing second data into a second data section of the first storage unit;
   reading the common data, the first data, and the second data from the first storage unit; and
   storing the common data, the first data, and the second data into a second storage unit to form a first memory bank and a second memory bank in the second storage unit, the first memory bank storing the common data and the first data, the second memory bank storing the common data and the second data,
   wherein the first storage unit stores a single copy of the common data,
   wherein steps of reading the common data, the first data, and the second data from the first storage unit and storing the common data, the first data, and the second data into the second storage unit comprise:
      reading the common data and the first data from the first storage unit;
      storing the common data and the first data read from the first storage unit into the second storage unit to form the first memory bank;
      replicating one copy of the common data by directly using the common data stored in the first memory bank of the second storage unit;
      reading the second data from the first storage unit; and
      storing the replicated common data and the second data read from the first storage unit into the second storage unit to form the second memory bank.

6. The method as recited in claim 5, wherein a size of the first memory bank is equal to that of the second memory, and a size of a storage space of the first data section is different than that of a storage space of the second data section.

7. The method as recited in claim 5, wherein the first data comprises information of a data size or an addressing space of the common data.

8. The method as recited in claim 7, wherein reading the common data, the first data, and the second data from the first storage unit and storing the common data, the first data, and the second data into the second storage unit comprises writing the common data and the second data into the second storage unit according to the information of the data size or the addressing space of the common data to form the second memory bank.

* * * * *